(12) United States Patent
Yoshida et al.

(10) Patent No.: US 6,288,981 B1
(45) Date of Patent: Sep. 11, 2001

(54) MAGNETO-OPTICAL RECORDING DEVICE USING MAGNETO-RESISTIVE HEAD

(75) Inventors: Kazuetsu Yoshida, Hidaka; Hiroaki Nemoto; Hideki Saga, both of Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/618,280

(22) Filed: Jul. 18, 2000

(51) Int. Cl.$^7$ .................................................. G11B 11/00
(52) U.S. Cl. .............................................................. 369/13
(58) Field of Search ........................... 369/13, 14, 112.01, 369/110.01; 300/59, 114, 313, 324, 326, 328; 365/122

(56) References Cited

U.S. PATENT DOCUMENTS

| | | | |
|---|---|---|---|
| 5,497,359 | * 3/1996 | Mamin et al. | 369/44.15 |
| 5,585,984 | * 12/1996 | Hasegawa et al. | 360/113 |
| 5,828,526 | * 10/1998 | Kagawa et al. | 360/113 |
| 5,881,042 | * 3/1999 | Knight | 369/99 |
| 5,970,038 | * 10/1999 | Boutaghou et al. | 369/112 |
| 6,069,853 | * 5/2000 | Novotny et al. | 369/13 |
| 6,130,864 | * 10/2000 | Burroughs | 369/13 |
| 6,160,769 | * 12/2000 | Ohnuki et al. | 369/13 |
| 6,172,944 | * 1/2001 | Hatam-Tabrizi | 369/13 |
| 6,172,945 | * 1/2001 | Hatam-Tabrizi | 369/13 |
| 6,191,916 | * 2/2001 | Sasaki | 360/123 |
| 6,204,997 | * 3/2001 | Sasaki | 360/123 |

* cited by examiner

*Primary Examiner*—Tan Dinh
(74) *Attorney, Agent, or Firm*—Kenyon & Kenyon

(57) ABSTRACT

In an optical recording and magnetic-head reproducing system, the reproduced output is prevented from starting to decrease, upon the length of record bits getting shorter, in the range of the bit length larger than reproducing resolution of a magnetic reproducing head.

When data are recorded magneto-optically on a magnetic recording medium, the radius of curvature of arcs constituting the boundary of recorded magnetic domains is made as large as possible so that the shape of the recorded spot may be substantially rectangular. As a result, it becomes possible to improve the efficiency of magnetic reproduction, and high-output as well as high-SN-ratio reproduction at high linear recording density can be achieved.

3 Claims, 2 Drawing Sheets

| | | |
|---|---|---|
| SURFACE PROTECTIVE | SiN | 20nm | —32
| READOUT LAYER | TbFeCo | 70nm | —34
| RECORDING LAYER | TbFeCo | 40nm | —33
| UNDER PROTECTIVE LAYER | SiN | 50nm | —32
| SUBSTRATE | (POLYCARBONATE) | | —31

MAGNETO-OPTICAL RECORDING DEVICE USING MAGNETO-RESISTIVE HEAD

BACKGROUND OF THE INVENTION

1. Field of the Invention

The present invention relates to a magnetic recording device which has a means to record signals as magnetic data optically and reproduce the data with a magnetic head. More specifically, the present invention relates to a magnetic recording device with high resolution and an excellent SN (signal-to-noise) ratio even in high-density recording.

2. Description of the Related Art

With the rapidly increasing amount of digital information spreading in our society in recent years, the storage capacities of storage media, such as magnetic disks, floppy disks, and magnetic tapes and those of optical memory devices, have been increasing quite rapidly. The recording densities of magnetic-disc devices, in particular, have been increasing by 40–60% per annum, and some of them have as high an areal recording density as 4 Gb/in$^2$. The densification of magnetic recording devices has been supported by such technological innovation as increases in the resolution and the SN ratios of magnetic disks and the sensitivity of magnetic heads. In the case of magnetic disks, their resolution and SN ratios have been enhanced mainly by reducing the size of particles which form their magnetic thin films. However, the approach has a physical limit, i.e., thermal instability. In other words, magnetic particles have to be reduced in size to reduce the noise of the thin films of magnetic recording media, whereas reducing the particle size beyond a certain level causes thermal instability which, in turn, causes the recorded data of the media to vanish. Thus, there is a trade-off relation between the SN ratio and the thermal stability. To solve this problem, the technology of perpendicular magnetic recording and thermomagnetic recording is being developed. The advantage of the perpendicular magnetic recording is that the thin film of a perpendicular-recording disk can be made thicker as compared with that of a conventional longitudinal-recording disk, increasing the volume of magnetic particles. The advantage of the thermomagnetic recording is that the resistance to thermal instability rises because, compared with the magnetic film for magnetic recording, a magnetic film having a very strong coercive force at room temperature is used as the recording film.

In the case of the thermomagnetic recording, data are usually recorded on a disk by radiating a laser beam to the recording layer to reverse the perpendicular magnetization of the recording film. To reproduce the recorded data, the directions of magnetization are read out directly from the recording film or from the copying layer formed on the recording film by utilizing the optical Kerr effect. This optical recording system is capable of forming record bits smaller than the diameter of the beam spot, but has difficulty in reading smaller bits than the beam spot in the process of reproduction, presenting the problem of poor resolution in the range of high linear-recording density. To solve this problem, Japanese Laid-open Patent Publication No. 10-21598 discloses a technique using, instead of an optical head, a magnetic head for magnetic recording/reproducing device s in the process of reproduction. In general, the resolution of a reproducing magnetic head is determined by its shield-gap length of the sensor (gap length), and the gap length of a magneto-resistive head put recently to practical use is reduced to 0.2 μm. The gap length is equivalent to the resolution capable of reproducing 0.1 μm record bits. Since the resolution of current optical disks using a light source of wavelength of 660 nm is about 0.5 μm, the areal recording density can be raised by five times by using the above-described head. In reality, however, that large an enhancement of resolution is difficult to achieve. Its main factor is the shape of the recorded magnetic domains. If data are recorded on a disk with an ordinary optical recording device and recorded optical spots are examined with a polarization microscope, each spot is in a crescent shape as shown in FIG. 4. Its reason is that the sectional shape of the recording beam is circular. On the other hand, the gap portion of a magnetic-reproducing head, which absorbs leakage fluxes from the medium, is in the shape of a rectangle that is long in the direction of width of the track. Therefore, the magnetic-reproducing head cannot efficiently reproduce the magnetic fluxes from the crescent-shaped recorded magnetic domains. The shorter the bit length gets, the lower the efficiency becomes. Thus, even when a magnetic reproducing head is used, sufficiently high resolution cannot be achieved.

SUMMARY OF THE INVENTION

The current optical recording and magnetic-head reproducing system has the problem that it cannot make full use of the capability of the reproducing magnetic head because the reproduced output decreases as the length of record bits shortens.

The above problem can be solved by recording data on a disk magneto-optically so as to make the radius of curvature of the boundary arcs of each recorded magnetic domain as large as possible and thereby make the domain's shape as rectangular as possible.

The advantage offered by the present invention is mainly that the recorded magnetic domains are rendered near rectangular while data are thermomagnetically recorded on a medium with an optical head; therefore the efficiency of magnetic reproduction with a GMR head rises. Thus, the characteristic of high reproducing resolution of the GMR head can be fully utilized. As a result, high-output as well as high-SN-ratio reproduction at high linear recording density can be achieved.

DETAILED DESCRIPTION

Figure 2:
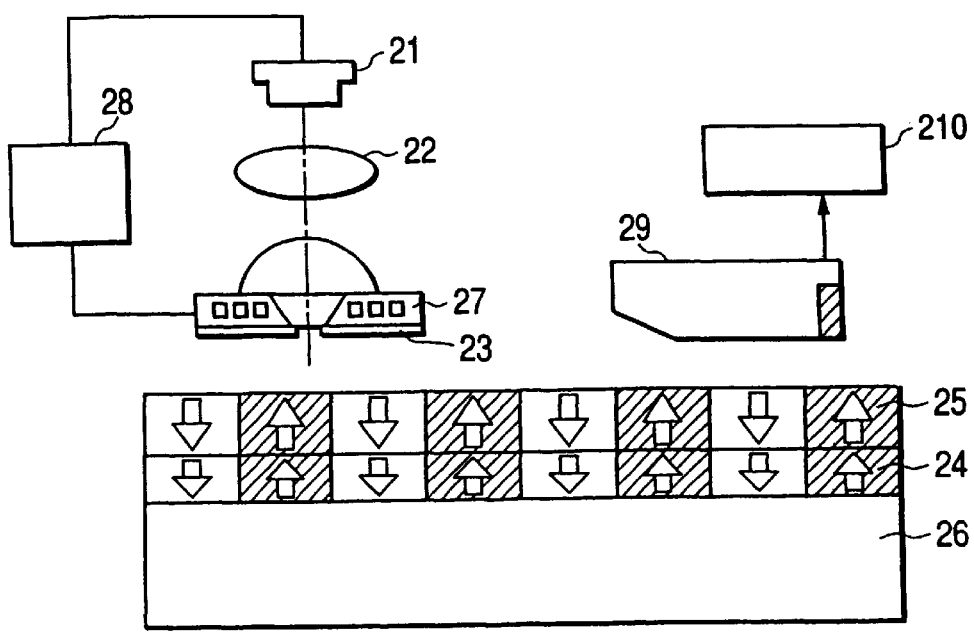
FIG. 2 is a schematic diagram of a magnetic recording device according to the present invention.
Figures 3, 4:
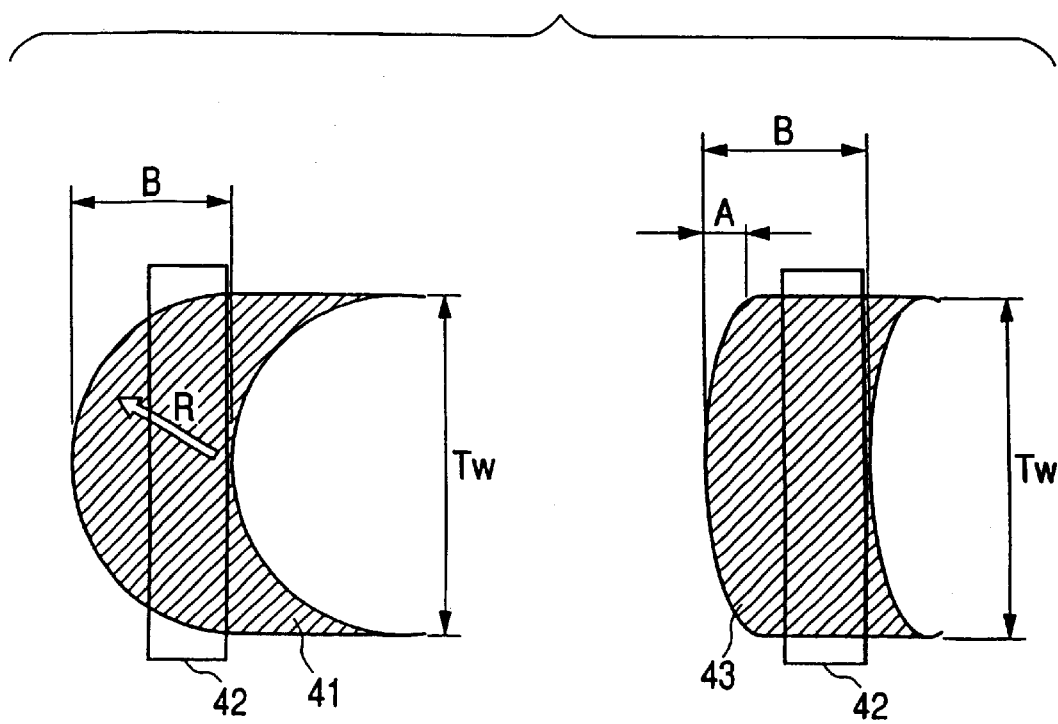
FIG. 3 is a view showing the construction of a medium for optical recording and magnetic reproduction.
FIG. 4 illustrates recorded magnetic domain shapes written on a recording layer.

FIG. 2 shows the outline of an embodiment of a magnetic recording device of the present invention. The reference numeral 21 is a laser diode for optical recording. The numeral 22 is an objective lens to focus a laser beam on a recording layer 24. A spherical lens is disposed below, or on the light-outgoing side of the object lens 22, and an aperture 23 is disposed further below. The numeral 27 is a magnetic-field modulating coil to modulate the directions of magnetization of the recording film in accordance with signal currents. The numeral 28 is a circuit to drive the optical laser and the magnetic head. These elements work to record data into the recording film as magnetization of upward and downward directions. Data are read out from the media by copying the magnetization of the recording layer to the readout layer 25 magnetically and reproducing the leakage fluxes from the readout layer 25 with a magnetic head 29. The signals read by the magnetic head are demodulated into the original data by a signal-processing circuit 210. FIG. 3 shows the construction of the recording medium used in this embodiment. A protective layer 32 of SiN is formed on a polycarbonate substrate 31. Formed on the protective layer 32 are a 40 nm-thick recording layer 33 of $Tb_{21}Fe_{70}Co_9$, a 70 nm-thick readout layer 34 of $Tb_{35}Fe_{56}Co_9$, and a 20 nm-thick protective layer 32 of SiN. Used as the magnetic reproducing head was a GMR head that made use of the giant magneto-resistive effect and of which the track width and the shield gap (Gs) were 1.0 $\mu$m and 0.2 $\mu$m, respectively. The gap between the head and the surface of the medium was 0.04 $\mu$m. A laser diode was used as the light source for recording. Its wavelength and spot diameter were 660 nm and 1.0 $\mu$m, respectively.

Figure 1:
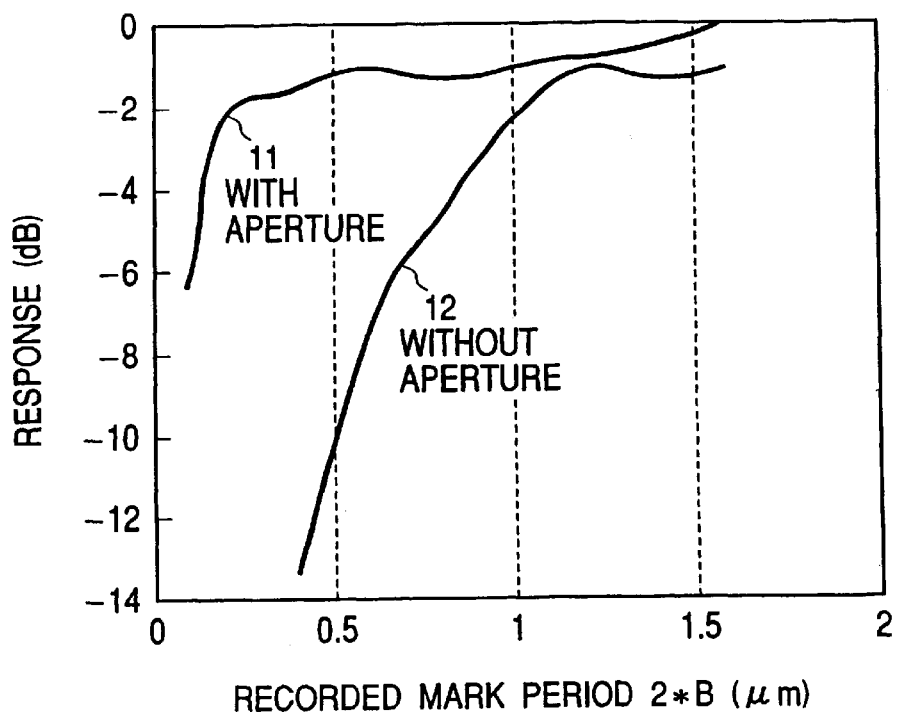
FIG. 1 is a view showing the dependence of reproduced output on a recorded mark period in the cases when an aperture is provided and when such aperture is not provided.

By using the above magnetic recording device and providing an aperture on the laser beam-outgoing side, the effects of the aperture on the shape of recorded spots, the reproduced output, and the resolution were examined. The aperture was rectangular, being 0.6 $\mu$m long in the direction of the track and 1.0 $\mu$m wide in the direction of width of the track. First, by using the aperture and changing the record bit length B, "1" was recorded in all bits. Second, for the purpose of comparison, without using the aperture and by changing the bit length, "1" was recorded in all bits. FIG. 1 shows the relation between the linear recording density and the reproduced output. It is clearly shown that the reproduced output was maintained at a high level until the bit length was reduced to about 0.1 $\mu$m (0.2 $\mu$m in terms of the recorded mark period) in the first case (11), whereas the reproduced output dropped sharply when and after the bit length was reduced to 0.5 $\mu$m (1.0 $\mu$m in terms of the recorded mark period) in the second case (12).

FIG. 4 illustrates the recorded domain shape observed with a polarization microscope. In the second case, the recorded magnetic domain 41 took a crescent-like shape, its track width Tw being 0.8 $\mu$m. The radius of curvature R of its arcs was 0.4 $\mu$m. It can be seen from this illustration that when the shield gap portion (42; shown by a bold line) of the GMR head comes to directly above the bits while the bit length B is 0.5 $\mu$m (the reproduced output drops sharply in the range of bit length below 0.5 $\mu$m), the GMR head picks up not only the fluxes from the record bits but also magnetic fluxes from the adjoining area of the opposite polarity, reducing the reproduced output sharply. In the first case, the recorded bit (43) took an almost rectangular shape, reflecting the shape of the aperture. Its track width Tw was 0.8 $\mu$m. and the radius of curvature R of the arcs constituting its boundary was 3.6 $\mu$m. It can be seen from the illustration that almost whole part of the shield gap portion of the GMR head comes within the boundary of the recorded bit while the bit length is 0.5 $\mu$m and without an aperture, and hence the head does not pick up magnetic fluxes from the adjoining area of the opposite polarity. Thus, as compared with those of the second case, higher output and remarkably higher resolution can be achieved in the first case. Even in the first case, however, if the bit length is shortened to such an extent (the extent being B=0.1 $\mu$m in the embodiment) as the value of "B−A", "A" being the bulging height of the arcs, becomes less than about ⅔ of the effective gap (Gs/2), Gs being the shield gap, the reproduced output is reduced due to the gap-loss characteristic of the GMR head, regardless of its arrangement not to pick up magnetic fluxes from the adjoining area.

Ascertained from the above were two requirements for achieving a high reproduced output and a high-resolution characteristic in an optical-recording, magnetic-head-reproducing system. First requirement is to render the recorded magnetic domain rectangular as much as possible by enlarging the radius of curvature of the arcs constituting its boundary as much as possible. The second requirement is to reduce the gap loss of the GMR head by rendering the bit length after subtracting the bulging height of the arcs larger than ⅔ of the effective gap (Gs/2). More preferably, the bit length after subtracting the bulging height of the arcs larger than 1 of the effective gap (Gs/2). By putting the two requirements together, the following conditional expression can be obtained:

$$B-A=B-(R-(R^2-(Tw/2)^2)^{0.5})\geq(\tfrac{2}{3})\cdot(G_s/2)$$

When a higher reproduced output is needed, it is desirable to satisfy the following condition:

$$B-A=B-(R-(R^2-(Tw/2)^2)^{0.5})\geq G_s/2$$

What is claimed is:

1. A magnetic recording device comprising: a magnetic recording medium having a magnetic recording layer, a head comprising an optical recording head with which data are recorded on the magnetic recording medium and a magneto-resistive head or a giant magneto-resistive head with which data are read out from the magnetic recording medium, and a drive unit associating said magnetic recording medium with the head; wherein the radius of curvature R of a magnetic domain shape recorded on the magnetic recording layer, a recorded track width Tw, a record bit length B and a shield gap Gs of a (giant) magneto-resistive head satisfy the following condition:

$$B-(R-(R^2-(Tw/2)^2)^{0.5})\geq\tfrac{2}{3}\cdot G_s/2.$$

2. A magnetic recording device according to claim 1, wherein said optical recording head is provided with an aperture on the light-outgoing side.

3. A magnetic recording device according to claim 2, wherein the shape of said aperture is rectangular.

* * * * *